United States Patent
Li et al.

(10) Patent No.: US 9,787,447 B2
(45) Date of Patent: *Oct. 10, 2017

(54) METHOD FOR TRANSMITTING A SOUNDING REFERENCE SIGNAL IN A LTE TDD SYSTEM

(75) Inventors: Yingyang Li, Beijing (CN); Xiaoqiang Li, Beijing (CN)

(73) Assignee: Samsung Electronics Co., Ltd. (KR)

( * ) Notice: Subject to any disclaimer, the term of this patent is extended or adjusted under 35 U.S.C. 154(b) by 396 days.

This patent is subject to a terminal disclaimer.

(21) Appl. No.: 13/602,965

(22) Filed: Sep. 4, 2012

(65) Prior Publication Data

US 2012/0327860 A1    Dec. 27, 2012

Related U.S. Application Data

(63) Continuation of application No. 12/491,792, filed on Jun. 25, 2009, now Pat. No. 8,259,700.

(30) Foreign Application Priority Data

Jun. 25, 2008  (CN) .......................... 2008 1 0124888
Jul. 22, 2008  (CN) .......................... 2008 1 0134019

(51) Int. Cl.
*H04L 5/00*        (2006.01)
*H04L 27/26*       (2006.01)
*H04L 5/14*        (2006.01)

(52) U.S. Cl.
CPC .......... *H04L 5/0048* (2013.01); *H04L 5/0051* (2013.01); *H04L 5/14* (2013.01); *H04L 27/2611* (2013.01); *H04L 5/0007* (2013.01)

(58) Field of Classification Search
CPC .......... H04B 7/2621; H04J 11/00; H04L 5/06; H04L 5/0007; H04L 27/206;
(Continued)

(56) References Cited

U.S. PATENT DOCUMENTS 7,957,759 B2 *  6/2011  Papasakellariou ............ 455/522
7,990,916 B2    8/2011  Muharemovic et al.
(Continued)

FOREIGN PATENT DOCUMENTS

CN       101505485       8/2009
KR       1020070080556   8/2007
(Continued)

OTHER PUBLICATIONS

Texas Instruments et al., "Way Forward on UE Specific SRS Configuration", R1-082738, 3GPP TSG RAN WG1 53b, Jun. 30-Jul. 4, 2008.*

(Continued)

*Primary Examiner* — Khoa Huynh
(74) *Attorney, Agent, or Firm* — The Farrell Law Firm, P.C.

(57) ABSTRACT

A method for transmitting an uplink Sounding Reference Signal (SRS) by a Long Term Evolution (LTE) User Equipment (UE). The UE receives information indicating an SRS transmission, generates an SRS, and transmits the SRS in two OFDM symbol in a half-frame or frame, if the information indicates that a period of SRS transmission is 2 ms.

8 Claims, 7 Drawing Sheets

(58) Field of Classification Search
CPC ....... H04L 5/0048; H04L 5/0051; H04L 5/14; H04L 27/2611; H04W 80/04; H04W 84/12; H04W 84/18; H04W 88/06; H04W 88/08
See application file for complete search history.

(56) References Cited

U.S. PATENT DOCUMENTS

| | | | |
|---|---|---|---|
| 8,055,301 | B2 | 11/2011 | Teo et al. |
| 2004/0131007 | A1 | 7/2004 | Smee et al. |
| 2008/0039098 | A1 | 2/2008 | Papasakellariou et al. |
| 2008/0080476 | A1 | 4/2008 | Cho et al. |
| 2008/0212506 | A1* | 9/2008 | Lee et al. ............... 370/310 |
| 2009/0010219 | A1 | 1/2009 | Lee et al. |
| 2009/0046570 | A1 | 2/2009 | Sarkar et al. |
| 2009/0180435 | A1 | 7/2009 | Sarkar |
| 2009/0238165 | A1 | 9/2009 | Cai et al. |
| 2009/0238241 | A1 | 9/2009 | Hooli et al. |
| 2009/0274076 | A1* | 11/2009 | Muharemovic ....... H04L 5/0039 370/280 |
| 2010/0103902 | A1 | 4/2010 | Kim et al. |
| 2010/0265910 | A1 | 10/2010 | Suo et al. |
| 2010/0309852 | A1 | 12/2010 | Li et al. |
| 2011/0176480 | A1* | 7/2011 | Dahlman ............ H04L 5/0051 370/328 |

FOREIGN PATENT DOCUMENTS

| | | |
|---|---|---|
| KR | 1020080030859 | 4/2008 |
| RU | 2005 125 045 | 1/2006 |
| WO | WO 2008/057412 | 5/2008 |
| WO | WO 2009/099273 | 8/2009 |

OTHER PUBLICATIONS

Zyren, Jim, "Overview of the 3GPP Long Term Evolution Physical Layer", Freescale Semiconductor, Jul. 2007.*
3GPP, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.2.0, Mar. 2008.*
CATT, RITT, "SRS Configuration for TDD", R1-081777, 3GPP TSG RAN WG1 Meeting #53, May 9, 2008.
Texas Instruments, "Views on SRS Parameters", R1-081366, 3GPP TSG RAN WG1 #52bis, Apr. 4, 2008.
Huawei, "SRS Subframe Configuration", R1-081786, 3GPP TSG-RAN-WG1 Meeting #53, May 9, 2008.
Samsung: "SRS Indication for TDD", TSG-RAN WG1 #52bis, 3GPP Draft; R1-081211, 3rd Generation Partnership Project (3GPP), Mar. 26, 2008.
Samsung, "Views on SRS Subframe Indication in DBCH", R1-081738, 3GPP TSG RAN WG1 Meeting #53, May 5-9, 2008.
Nokia, Nokia Siemens Networks, "SRS Configuration for LTE TDD", 3GPP TSG-RAN WG1 Meeting #53, R1-081862, May 14, 2008.
Japanese Office Action dated Jan. 29, 2015 issued in counterpart application No. 2014-057861.
Samsung et al., "UE Specific Signaling for SRS Transmission", R1-082307, TSG-RAN WG1 #53bis, Jun. 30-Jul. 4, 2008, 5 pages.
Texas Instruments, "UE Specific SRS Configuration", R1-081992, 3GPP TSG-RAN WG1 #53, May 5-9, 2008, 2 pages.
Japanese Office Action dated Jan. 4, 2016 issued in counterpart application No. 2014-057861, 6 pages.
Chinese Office Action dated Aug. 30, 2013 issued in counterpart application No. 200810134019.X, 11 pages.

* cited by examiner

| Configuration | transition point period | subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 10ms | D | S | U | U | U | D | S | U | U | D |

Figure 5

METHOD FOR TRANSMITTING A SOUNDING REFERENCE SIGNAL IN A LTE TDD SYSTEM

PRIORITY

This application is a continuation of application Ser. No. 12/491,792, filed Jun. 25, 2009, now U.S. Pat. No. 8,259,700, which claims priority under 35 U.S.C. §119 to Chinese Patent Applications that were filed in the China Patent and Trademark Office on Jun. 25, 2008 and Jul. 22, 2008, and assigned Serial Nos. 200810124888.4 and 200810134019.X, respectively, the entire contents of each of which are incorporated herein by reference.

BACKGROUND OF THE INVENTION

1. Field of the Invention

The present invention relates generally to a communication system, and more particularly to a method for transmitting a Sounding Reference Signal (SRS) in a Long Term Evolution (LTE) communication system and an apparatus using the same.

2. Description of the Related Art

The 3rd Generation Partner Project (3GPP) standardization organization is working on a next generation of wireless communication standard, i.e., LTE. In a physical layer interface, LTE adopts Orthogonal Frequency Division Multiplexing (OFDM) technology, which is different from conventional Code Division Multiple Access (CDMA) technology. OFDMA is used in downlink and Single Carrier Frequency Division Multiple Access (SCFDMA) is used in uplink. The technology used in LTE is effective to resist multi-path propagation, with the adoption of frequency domain equalization reducing complexity of the conventional time domain equalization, and is more suitable for bandwidth high-speed data transmission.

From a point of view of air-interface, the LTE standard techniques can be divided into two categories: a Time Division Duplex (TDD) system and a Frequency Division Duplex (FDD) system. The LTE system supports variable bandwidths. And typical bandwidths include 1.4 MHz, 3 MHz, 5 MHz, 10 MHz, 15 MHz and 20 MHz, which can meet demands of different scenarios.

FIG. 1 illustrates a physical layer frame structure for a LTE FDD system in which a length of radio frame (101) is 10 ms, including ten equally sized radio sub-frames (102) of 1 ms length. Each radio sub-frame consists of two equally sized timeslots (103) of 0.5 ms length.

FIG. 2 illustrates a PHY layer frame structure for an LTE TDD system. As illustrated in FIG. 2, a length of radio frame (201) is 10 ms, and includes ten equally sized radio sub-frames (204) of length 1 ms. Each five continuous radio sub-frames makes up a half-frame (202) having a 5 ms length. Different from the LTE-FDD system, a second (211) and seventh (212) radio sub-frame in LTE-TDD radio frame are two special sub-frames. A length of the special sub-frame is 1 ms, including three special slots, indicating a Downlink Pilot Time Slot (DwPTS) (205 or 208), a Guard Period (GP) (206 or 209) and Uplink Pilot Time Slot (UpPTS) (207 or 210), respectively. The lengths of the three special slots are variable and may be defined differently by each system, but the total length is 1 ms. The length of the UpPTS can be 0, 1, or 2 SCFDMA symbols. If the length of the UpPTS is 2, the UpPTS is used to transmit the uplink Short Random Access CHannel (RACH) or Uplink SRS signal or both the Short RACH and the SRS signal. If the length of the UpPTS is 1, the UpPTS is used to transmit the uplink SRS signal. The other eight sub-frames, except the special two, respectively consist of two slots of length 0.5 ms.

In the LTE system, according to network scheduling, a User Equipment (UE) sends an SRS to evolved NodeB (eNodeB). According to an analysis result of the SRS signal, the eNodeB estimates a quality of channel that is used for transmitting SRS from UE to eNodeB and scheduling data according to frequency selective characteristics. Further, the eNodeB performs timing tracking for UE by analyzing the SRS signal and performs a close-loop power control. According to a current standardizing process, main conclusions for SRS transmission in LTE FDD system include the eNodeB broadcasting the SRS in a designated cell as needed and SRS being periodically transmitted in some sub-frame in a designated cell. A period is selected from {2, 5, 10, 20, 40, 80, 160, and 320} ms.

After the UE receives the SRS in the designated cell, the ODFM symbol resource occupied by the SRS is not used when transmitting uplink data. In order to perform the transmission of SRS, the UE should receive a user-designated SRS signal transmitted from the network. The signal informs the user of the OFDM symbol resource that is used to transmit SRS. Currently, there is no description for transmitting the SRS for a designated UE in a PHY layer specification, which is accomplished in LTE.

Currently, a basic idea in the standard for the user-designated SRS signaling is that the signaling includes three parts: Duration, Period, and Offset, in which, the duration can use 1 bit to indicate that just one snapshot or infinite. The period value is selected from {2, 5, 10, 20, 40, 80, 160, 320} ms.

In LTE FDD, the offset is a time between two transmission times of each OFDM symbol of the SRS from the beginning of the SRS period, and the basic unit is 1 ms. In LTE TDD, the definition of offset is different from that in LTE FDD. Since in LTE TDD, the SRS can be transmitted in the UpPTS or the other uplink sub-frame, the uplink sub-frame may be discontinuous and the UpPTS occupies two OFDM symbols at most, the offset is defined as an interval between an OFDM symbol position used to transmit SRS and an OFDM symbol position used to transmit the SRS until the period of SRS transmission starts. For example, if the SRS symbol position at the period beginning is defined as 0, a symbol position used to transmit SRS is 3, which means that the interval between the two symbols is 3. Consequently, there is at most 2 OFDM symbol positions can be used to transmit SRS.

The manner of transmitting the SRS in LTE TDD is mainly the same as that in LTE FDD. However the system structure of LTE TDD is different from of that in LTE FDD. A difference is that in LTE TDD, a half-frame of length 5 ms has both uplink sub-frame and downlink sub-frame, a number of uplink sub-frames and downlink sub-frames are configured by the network. In some configuration, a half-frame of length 5 ms at least has one uplink sub-frame (excluding the UpPTS).

According to a principle that only one SRS is transmitted in one uplink sub-frame, there is only one SRS transmission in every 5 ms, and the system cannot achieve the SRS transmission with a 2 ms period. Therefore, the performance of the SRS transmission by the UE is deteriorated in a fast Time-varying channel.

Based on the difference between the LTE TDD and LTE FDD, the current configuration of the 2 ms transmission period for the SRS in the LTE FDD cannot be used in the LTE TDD system.

SUMMARY OF THE INVENTION

Accordingly, the invention has been designed to solve at least the above-mentioned problems occurring in the prior art, and embodiments of the invention provide apparatus and method for transmitting an SRS in an LTE TDD system.

An object of the present invention is to provide a format of SRS in LTE FDD and LTE TDD will be the same.

Another object of the present invention is to handle a problem of supporting a 2 ms period in the LTE TDD system.

Another object of the present invention is to provide a method for transmitting an SRS in an LTE TDD communication system.

In accordance with an object of present invention, a method for transmitting uplink SRS information by an LTE UE is provided. The method includes the UE receiving information N indicating SRS transmission, generating an SRS sequence, and transmitting the SRS in two OFDM symbols in a half-frame or a frame if the information N indicates that a period for transmitting SRS is 2 ms.

In accordance with another object of the present invention, a method for transmitting uplink SRS information by an LTE UE is provided. The method includes the UE receiving information N indicating SRS transmission, generating a SRS sequence, and transmitting the SRS by occupying one OFDM symbol or two OFDM symbols in a period based on the information N.

BRIEF DESCRIPTION OF THE DRAWINGS

The above and other objects, features, and advantages of the present invention will be more apparent from the following detailed description taken in conjunction with the accompanying drawings, in which:

FIG. 5 is a schematic diagram illustrating seven types of uplink and downlink configurations in an LTE TDD system;

DETAILED DESCRIPTION OF EMBODIMENTS OF THE PRESENT INVENTION

Figure 1:
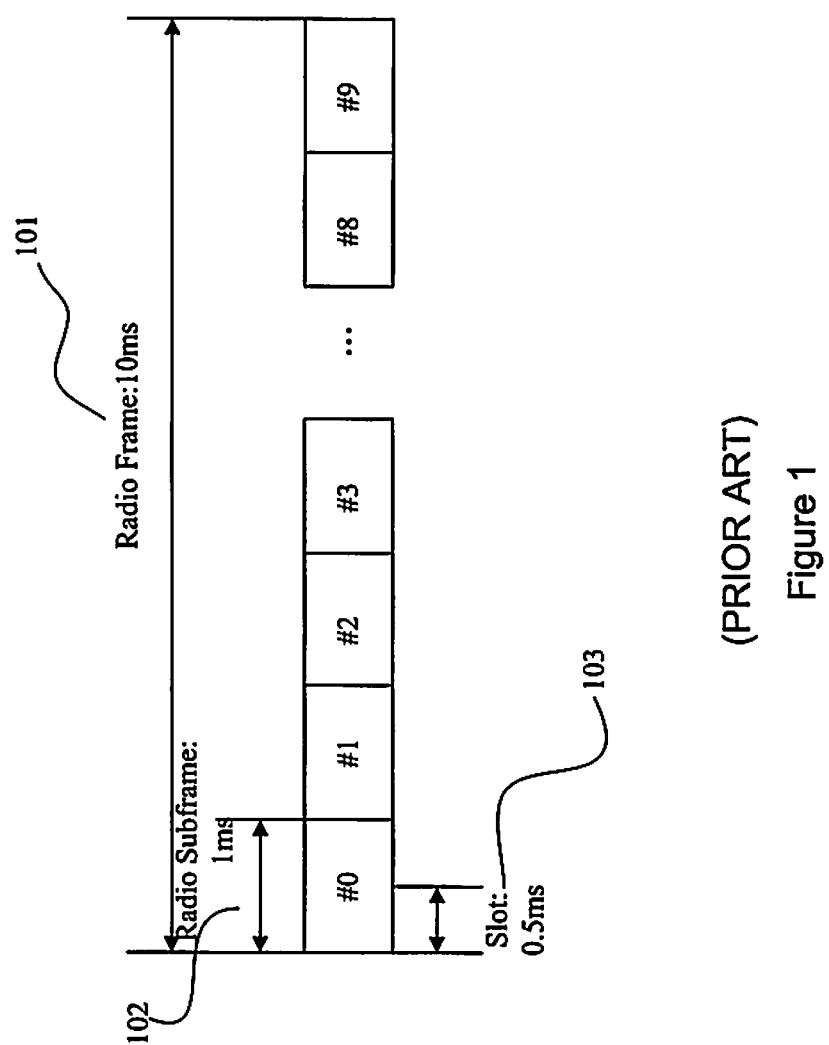
FIG. 1 is a schematic diagram illustrating a frame structure in an LTE FDD system.
Figure 2:
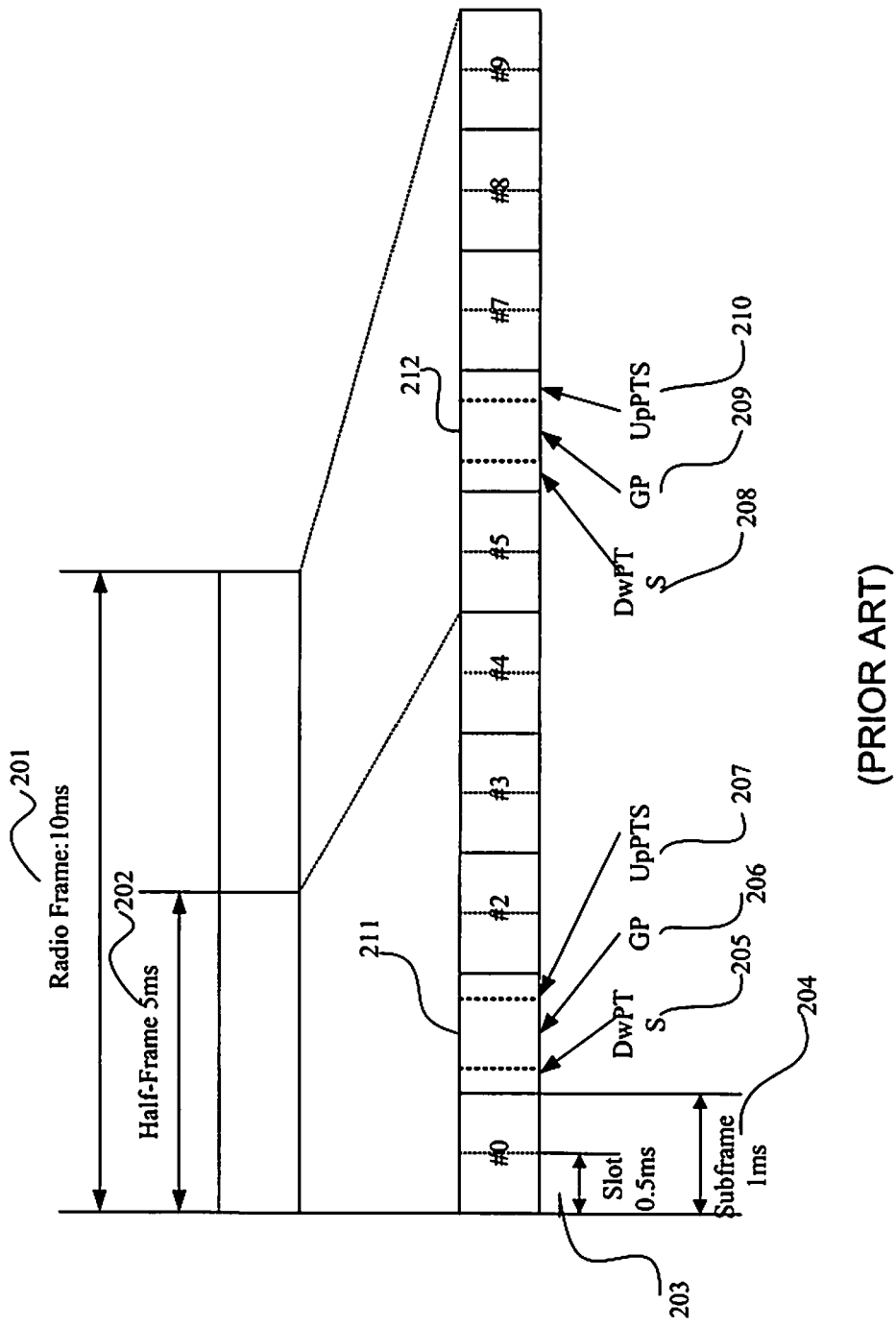
FIG. 2 is a schematic diagram illustrating a frame structure in an LTE TDD system.

The present invention now will be described more fully with reference to the accompanying drawings. The present invention may, however, be embodied in many different forms and should not be construed as limited to the embodiments set forth herein.

For the LTE FDD system, because the maximum period of an SRS is among {2, 5, 10, 20, 40, 80, 160, 320} ms, in order to achieve a maximum flexibility, for an arbitrary period, a possible SRS offset is select from {0, 1, ..., Period-1}. Therefore, for the LTE FDD, the SRS of the designated user includes 2+5+10+20+40+80+160+320=637 indexes. This method provides a maximum flexibility, and uses 10 bits to present 637 indexes. Because, however, 1024 pieces of information may actually be indicated by the 10 bits, the other 1024−637=387 indexes are reserved for various purposes.

When the period is 320 ms, providing at most 320 offsets is unnecessary, and the 10 bits may be not the most efficient process. In this condition, the number of indexes can be decreased with the decrease of the offset range, such that a total number of bits needed decreases and the number of reserved indexes decreases.

A UE receives an index N indicating a period of SRS transmission from base station. For an LTE TDD system, the period value of an SRS is also among (2, 5, 10, 20, 40, 80, 160, 320} ms. The design of offset is the same as in LTE FDD except that when the period is 2 ms and 5 ms. However, compared with LTE FDD, the difference is that in LTE TDD the uplink sub-frame is not always continuous, such that a complete period of 2 ms is not used. For this reason, the period of 2 ms for LTE should have some special design.

Currently, there are seven uplink and downlink configurations supported in LTE TDD, which are illustrated in FIG. 5.

Referring to FIG. 5, a group of corresponding SRS indexes is defined to indicate the SRS index of designated user of 2 ms period. For configurations of 0(501), 1(502), 2(503), and 6(507), all of the indexes indicate that in a 5 ms half-frame period or 5 ms frame period, two continuous or arbitrary OFDM positions from the OFDM symbols, which are configured to transmit SRS, are selected. The designated user is indicated to use this position to transmit SRS. For configurations 3(504), 4(505), and 5(506), all of the indexes indicate that in a 10 ms frame period, two continuous or arbitrary OFDM positions from the OFDM symbols, which are configured to transmit SRS, are selected. The designated user is indicated to use this position to transmit SRS. The definition mentioned is used to inform the designated user how to select the OFDM position used for SRS transmission in the 2 ms period.

Considering that in an LTE TDD system, there are at most 5 OFDM symbols used to transmit an SRS in a 5 ms half-frame, which includes two symbols in an UpPTS, and three OFDM symbols in an uplink sub-frame 2, 3 and 4. Thus, if the two selected symbols are arbitrary, the number of choices is C(5,2)=10 (C represents combination) with 10 corresponding indexes. The ten indexes correspond with the concrete OFDM symbols, however, any correspondence may be used without departing from the spirit and scope of the present invention.

For example, the correspondence may be selected randomly, or when making correspondence, assigning the indexes with high priority to a former or latter position. One consideration about priority is considering a situation with 1 or 2 UpPTS symbol(s) first. There are four situations (a last OFDM symbol and a first OFDM symbol is not logically continuous) or five situations (a last OFDM symbol and a first OFDM symbol is logically continuous), if two continuous OFDM symbols are selected, so that four or five indexes are used for indicating.

If the period is 5 ms, a special case in LTE TDD is that, for configurations 3(504), 4(505), and 5(506), there is no uplink resource in the second half-frame in a 10 ms frame. Accordingly, the SRS cannot be transmitted in the second half-frame. If the two continuous or arbitrary OFDM positions are selected from the OFDM symbols configured to transmit SRS in the first half-frame, the definition is the same as in LTE TDD with 2 ms period. Therefore, in order to simplify the system design, 5 ms period is not suitable for configurations 3, 4, and 5 in an LTE TDD in accordance with an embodiment of the present invention.

Compared with LTE FDD, in some situations, periods of 2 ms and 5 ms are not supported. Accordingly, the periods of 2 ms and 5 ms are redefined to achieve a similar function as in LTE FDD.

Based on the redefined method to redefine the 2 ms period of configurations 0 to 2 and 6, an actual period is 5 ms, that is, two SRS symbols are occupied every 5 ms. In order to redefine the 2 ms period of configurations 3 to 5, the actual period is 10 ms, that is, two SRS symbols are occupied every 10 ms. The redefinition described above for 2 ms and 5 ms period for LTE TDD can be used in system configuration and makes the comparison with LTE FDD relatively easy.

Often, a system does not support periods of 2 ms and 5 ms, and directly configures two SRSs in 5 ms or 10 ms. However, the main concept of these two methods is the same. That is, the concept of the method is the same as the redefinition of period.

More specifically for the second method, an SRS period of 2 ms is not supported in LTE TDD. For configurations 3 to 5, an SRS period of 5 ms is not supported. However, two SRS symbols can be configured every half-frame, i.e., every 5 ms, such as for configurations 0 to 2 and 6. Also, two SRS symbols can be configured in the first half-frame, i.e., every 10 ms, in a radio frame, such as for configurations 3 to 5. The configuration of two SRS symbols in every half-frame can use a similar method as the method used in the redefinition of 2 ms and 5 ms period described above. A completely flexible configuration indicates $C(5,2)=10$ choices, or decrease the number of selection by restricting the method of configuration.

Furthermore, the redefinition of 2 ms period described above configures two SRS symbols in a half-frame (5 ms). That is, it is reasonable that a 2 ms period is not supported in an LTE TDD system and two SRS symbols are configured every half-frame (5 ms). For configurations 0 to 2 and 6, the actual period is 5 ms, i.e., two SRS symbols are occupied every 5 ms. For configurations 3 to 5, the actual period is 10 ms, i.e., two SRS symbols are occupied every 10 ms. The configuration of two SRS symbols in every half-frame can use a similar method as used in the redefinition of 2 ms and 5 ms period described above. That is, a flexible configuration indicates $C(5,2)=10$ choices, or decrease the number of selection by limiting the method of configuration.

After the UE receives information N, which indicates SRS transmission from the network, when the SRS period indicated by N is less than or equal to the number of OFDM symbols configured to transmit SRS in an entire cell in a period, the offset can be calculated as follows:

I. If the range of N is from 0 to 320/f−1, the period indicated by N is 320 ms, then the SRS is transmitted by using offset N*f.

II. If the range of N is from 320/f to 320/f+160/m−1, the period indicated by N is 160 ms, then the SRS is transmitted by using offset N−320/f*m.

III. If the range of N is from 320/f+160/m to 320/f+160/m+80/t−1, the period indicated by N is 80 ms, then the SRS is transmitted by using offset N−320/f−160/m*t.

IV. If the range of N is from 320/f+160/m+80/t to 320/f+160/m+80/t+40/n−1, the period indicated by N is 40 ms, then the SRS is transmitted by using offset N−320/f−160/m−80/t*n.

V. If the range of N is from 320/f+160/m+80/t+40/n to 320/f+160/m+80/t+40/n+20/p−1, the period indicated by N is 20 ms, then the SRS is transmitted by using offset N−320/f−160/m−80/t−40/n*p.

VI. If the range of N is from 320/f+160/m+80/t+40/n−20/p to 320/f+160/m+80/t+40/n+20/p+10/x−1, the period indicated by N is 10 ms, then the SRS is transmitted by using offset N−320/f−160/m−80/t−40/n−20/p*x.

VII. If the range of N is from 320/f+160/m+80/t+40/n+20/p+10/x to 320/f+160/m+80/t+40/n+20/p+10/x+5−1, the period indicated by N is 10 ms, then the SRS is transmitted by using offset N−320/f−160/m−80/t−40/n−20/p−10/x.

In the calculations above, f, m, t, and n can be 1, 2, 4, and 8; p can be 1, 2, 4, 5, and 10; x can be 1, 2, and 5; and M represents a number of OFDM symbol configured to transmit SRS in a period in the whole cell indicated by information N. The values of f, m, t, n, and M are set statically in system specification.

After a UE receives the information N indicating the SRS transmission from network, when the SRS period indicated by N is greater than the number of OFDM symbols configured to transmit SRS in the entire cell in a period, the offset can be calculated as follows:

I. If the range of N is from 0 to M−1, the period indicated by N is 320 ms, then the SRS is transmitted by using offset N.

II. Reserved by the system if the range of N is from M to 320/f−1.

III. If the range of N is from 320/f to 320/f+M−1, the period indicated by N is 160 ms, then the SRS is transmitted by using offset N−320/f.

IV. Reserved by the system if the range of N is from M to 320/f+160/m−1.

V. If the range of N is from 320/f+160/m to M−1, the period indicated by N is 80 ms, then the SRS is transmitted by using offset N−320/f−160/m.

VI. Reserved by the system if the range of N is from M to 320/f+160/m+80/t−1.

VII. If the range of N is from 320/f+160/m+80/t to M−1, the period indicated by N is 40 ms, then the SRS is transmitted by using offset N−320/f−160/m−80/t.

VIII. Reserved by the system if the range of N is from M to 320/f+160/m+80/t+40/n−1.

IX. If the range of N is from 320/f+160/m+80/t+40/n to M−1, the period indicated by N is 20 ms, then the SRS is transmitted by using offset N−320/f−160/m−80/t−40/n.

X. Reserved by the system if the range of N is from M to 320/f+160/m+80/t+40/n+20/p−1.

XI. If the range of N is from 320/f+160/m+80/t+40/n+20/p to M−1, the period indicated by N is 10 ms, then the SRS is transmitted by using offset N−320/f−160/m−80/t−40/n−20/p.

XII. Reserved by the system if the range of N is from M to 320/f+160/m+80/t+40/n+20/p+10/x−1.

XIII. If the range of N is from 320/f+160/m+80/t+40/n+20/p+10/x to M−1, the period indicated by N is 5 ms, then the SRS is transmitted by using offset N−320/f−160/m−80/t−40/n−20/p−10/x.

XIV. Reserved if the range of N is from M to 320/f+160/m+80/t+40/n+20/p+10/x+5−1.

In the calculations above, f, m, t, and n can be 1, 2, 4, and 8; p can be 1, 2, 4, 5, and 10; x can be 1, 2, and 5; and M represents the number of OFDM symbols configured to transmit SRS in a period in the whole cell indicated by the information N. The values of f, m, t, n, and M are set statically in system specification.

The design method described above is the most basic SRS design for the designated user. The present invention considers the coherence of signal format in LTE FDD and LTE TDD.

First, the information bits indicating the SRS transmission of designated user in LTE FDD and LTE TDD is the same. For example, 10 bits or 9 bits are used to inform.

Next, the reserved index only occupies one section of continuous indexes, both in LTE FDD and LTE TDD.

According to the design principle of LTE TDD compatible with LTE FDD, the SRS transmission signal for designated user can be referred to from Table 1 below:

TABLE 1

| | Indexes of SRS signal | | |
|---|---|---|---|
| index | Period | offset | description |
| 0-4 | 5 | 0-4 | Configuration 3, 4 and 5 are reserved in LTE TDD |
| 5-14 | 10 | 0-9 | |
| 15-34 | 20 | 0-19 | |
| 35-74 | 40 | 0-39 | |
| 75-154 | 80 | 0-79 | |
| 155-314 | 160 | 0-159 | |
| 315-634 | 320 | 0-319 | |
| 635-1023 | 2 | 0-1 in FDD 0-9 for TDD | indexes 637-1023are reserved in LTE FDD indexes 645-1023are reserved in LTE TDD The offset in LTE TDD is the index of method, using which to select two SRS symbols from half-frame |

Table 2, below, is used to describe by using the same design principle:

TABLE 2

| | Indexes of SRS signal | | |
|---|---|---|---|
| Index | Period | Offset | Description |
| 0-319 | 320 | 0-319 | |
| 320-479 | 160 | 0-159 | |
| 480-559 | 80 | 0-79 | |
| 560-599 | 40 | 0-39 | |
| 600-619 | 20 | 0-19 | |
| 620-629 | 10 | 0-9 | |
| 630-634 | 5 | 0-4 | Configuration 3, 4 and 5 are reserved in LTE TDD |
| 635-1023 | 2 | 0-1 in FDD 0-9 for TDD | indexes 637-1023are reserved in LTE FDD indexes 645-1023are reserved in LTE TDD The offset in LTE TDD is the index of method, using which to select two SRS symbols from half-frame |

Considering the period values could be ordered from small to large, Table 3 uniformly describes the indexes of SRS signal for LTE TDD and LTE FDD:

TABLE 3

| | Indexes of SRS signal | | |
|---|---|---|---|
| Index | Period | Offset | Description |
| 0-9 | 2 | 0-1: LTE FDD 0-9: LTE FDD | 2-9 reserved in LTE FDD The offset in LTE TDD is the index of method, using which to select two SRS symbols from half-frame |
| 10-14 | 5 | 0-4 | Configuration 3, 4 and 5 are reserved in LTE TDD |
| 15-24 | 10 | 0-9 | |
| 25-44 | 20 | 0-19 | |
| 45-84 | 40 | 0-39 | |
| 85-164 | 80 | 0-79 | |
| 165-324 | 160 | 0-159 | |
| 325-1023 | 320 | 0-1 in FDD 0-9 for TDD | indexes 645-1023are reserved in LTE TDD |

In order to ensure a coherence of design for LTE FDD and LTE TDD, a degree of flexibility may be sacrificed in LTE TDD. If a period is 2 ms, the number of indexes is limited to 2 in LTE TDD, so that the number of indexes in LTE FDD and LTE TDD is exactly the same. This is shown in Table 4:

TABLE 4

| | Indexes of SRS signal | | |
|---|---|---|---|
| Index | Period | Offset | Description |
| 0-1 | 2 | 0-1 | |
| 2-6 | 5 | 0-4 | Configuration 3, 4 and 5 are reserved in LTE TDD |
| 7-16 | 10 | 0-9 | |
| 17-36 | 20 | 0-19 | |
| 37-76 | 40 | 0-39 | |
| 77-156 | 80 | 0-79 | |
| 157-316 | 160 | 0-159 | |
| 317-1023 | 320 | 0-1 in FDD 0-9 for TDD | indexes 637-1023are reserved |

In the above method, considering the coherence for LTE FDD and LTE TDD, the configuration in both systems should keep the same. The detailed method for LTE TDD is optimized. If using a different table for LTE FDD and LTE TDD is allowed, Tables 1 to 4 could just be used in LTE TDD, and another design for LTE FDD is achievable. The main difference is that in LTE FDD, only two indexes are occupied in 2 ms period.

The above description is the SRS configuration method based on the redefinition of 2 ms and 5 ms period in LTE TDD. For redefinition of the 2 ms period of configurations 0 to 2 and 6, the actual period is 5 ms. For redefinition of the 2 ms period of configurations 3 to 5, the actual period is 10 ms. When using the period value of the SRS for calculation, for the 2 ms period of configurations 0 to 2 and 6, 5 ms is used as the period, and for the 2 ms period of configurations 3 to 5, 10 ms is used as the period.

If the redefinition of 2 ms and 5 ms period in LTE TDD is not used, in some situations without supporting 2 ms and 5 ms period, the system defines that two SRSs are configured in 5 ms or 10 ms. When using the period of the SRS, the value of period is used to calculate directly. Tables 5 and 6 are two possible detailed configuration methods. The period value in Table 5 or 6 is an actual period value. It is assumed that all of C(5,2)=10 methods of selecting two SRS symbols in half-frame are supported.

In table 5, when the index is between 0 and 9, two SRSs are configured in a period of 5 ms. The corresponding offset 0 to 9 is the indexes for the methods for selecting two SRS symbols from a half-frame substantially. When the index is between 10 and 14, one SRS is configured in a period of 5 ms, and the offset presents a position of an assigned SRS. When the index is between 15 and 24, two SRS are configured in a period of 10 ms. The corresponding offset 0 to 9 is the index for the methods for selecting two SRS symbols from a half-frame substantially. When the index is between 25 and 34, one SRS is configured in a period of 10 ms, and the offset represents the position of assigned SRS.

TABLE 5

Indexes of SRS signal

| Index | Period | Offset | Description |
|---|---|---|---|
| 0-9 | 5 | 0-9 | The offset is the index of method, using which to select two SRS symbols from half-frame |
| 10-14 | 5 | 0-4 | |
| 15~24 | 10 | 0~9 | The offset is the index of method, using which to select two SRS symbols from half-frame |
| 25-34 | 10 | 0-9 | |
| 35-54 | 20 | 0-19 | |
| 55-94 | 40 | 0-39 | |
| 95-174 | 80 | 0-79 | |
| 175-334 | 160 | 0-159 | |
| 335-654 | 320 | 0-319 | |
| 655-1023 | | | Reserved |

Table 6 has the same effect as that of Table 5 except for an order of rows to implement a new embodiment. The invention is limited to the order of SRS period in the table.

In table 6, when the index is between 0 and 9, two SRSs are configured in a period of 5 ms. The corresponding offset 0 to 9 is the index of the methods for selecting two SRS symbols from a half-frame substantially. When the index is between 10 and 19, two SRSs are configured in a period of 10 ms. The corresponding offset 0 to 9 is the index of the methods for selecting two SRS symbols from a half-frame substantially. When the index is between 20 and 24, one SRS is configured in a period of 5 ms, and the offset represents the position of an assigned SRS. When the index is between 25 and 34, one SRS is configured in a period of 10 ms, and the offset value presents the position of an assigned SRS.

TABLE 6

Indexes of SRS signal

| Index | Period | Offset | Description |
|---|---|---|---|
| 0-9 | 5 | 0-9 | The offset is the index of method, using which to select two SRS symbols from half-frame |
| 10-19 | 10 | 0-9 | The offset is the index of method, using which to select two SRS symbols from half-frame |
| 20~24 | 5 | 0~4 | |
| 25-34 | 10 | 0-9 | |
| 35-54 | 20 | 0-19 | |
| 55-94 | 40 | 0-39 | |
| 95-174 | 80 | 0-79 | |
| 175-334 | 160 | 0-159 | |
| 335-654 | 320 | 0-319 | |
| 655-1023 | | | Reserved |

If the redefinition of 2 ms and 5 ms period in LTE TDD is not used, the period of 2 ms not supported in LTE TDD is defined and two SRSs are configured every half-frame (5 ms). Accordingly, when using the period value of SRS for calculating, for configurations 0 to 2 and 6, 5 ms is used as the period, and for configurations 3 to 5, ms is used as the period. Table 6 is a possible configuration method. It is assumed that all the C(5,2)=10 methods used to select two SRS symbols in a half-frame are supported.

In table 7, when the index is between 0 and 9, two SRSs are configured in a period of 5 ms. The corresponding offset 0 to 9 is the index of the methods for selecting two SRS symbols from a half-frame. When the index is between 10 and 14, one SRS is configured in a period of 5 ms, and the offset indicates the position of an assigned SRS. When the index is between 15 and 24, one SRS is configured in a period of 10 ms, and the offset presents the position of an assigned SRS.

TABLE 7

Indexes of SRS signal

| Index | Period | Offset | Description |
|---|---|---|---|
| 0-9 | 5 | 0-9 | The offset is the index of method, using which to select two SRS symbols from half-frame |
| 10-14 | 5 | 0-4 | |
| 15-24 | 10 | 0-9 | |
| 25-44 | 20 | 0-19 | |
| 45-84 | 40 | 0-39 | |
| 85-164 | 80 | 0-79 | |
| 165-324 | 160 | 0-159 | |
| 325-644 | 320 | 0-319 | |
| 645-1023 | | | Reserved |

C(5,2)=10 indexes are used to achieve complete flexibility for transmitting two SRSs in a period. A mapping method from the indexes to two selected SRS symbols is as follows:

I. When an UpPTS includes two SRS symbols, a first SRS symbol is indicated by SRS sub-frame offset 0 and a second SRS symbol is indicated by SRS sub-frame offset 1.

II. When UpPTS includes one SRS symbol, the SRS symbol is indicated by SRS sub-frame offset 1. The SRS symbol in the other sub-frame is indicted by the corresponding offset (that is, 2, 3 or 4).

Therefore, a possible mapping method from C(5,2)=10 indexes to two selected SRS symbols is shown in Table 8.

TABLE 8

Mapping from 10 indexes to two selected SRS symbols

| Index | Offset |
|---|---|
| 0 | 0, 1 |
| 1 | 0, 2 |
| 2 | 1, 2 |
| 3 | 0, 3 |
| 4 | 1, 3 |
| 5 | 0, 4 |
| 6 | 1, 4 |
| 7 | 2, 3 |
| 8 | 2, 4 |
| 9 | 3, 4 |

The network uses Radio Resource Control (RRC) signal to transmit the SRS signal generated.

The generated SRS information is mapped to a transmission channel and a physical channel, and then transmitted to a UE through an antenna, after being processed accordingly.

Figure 3:
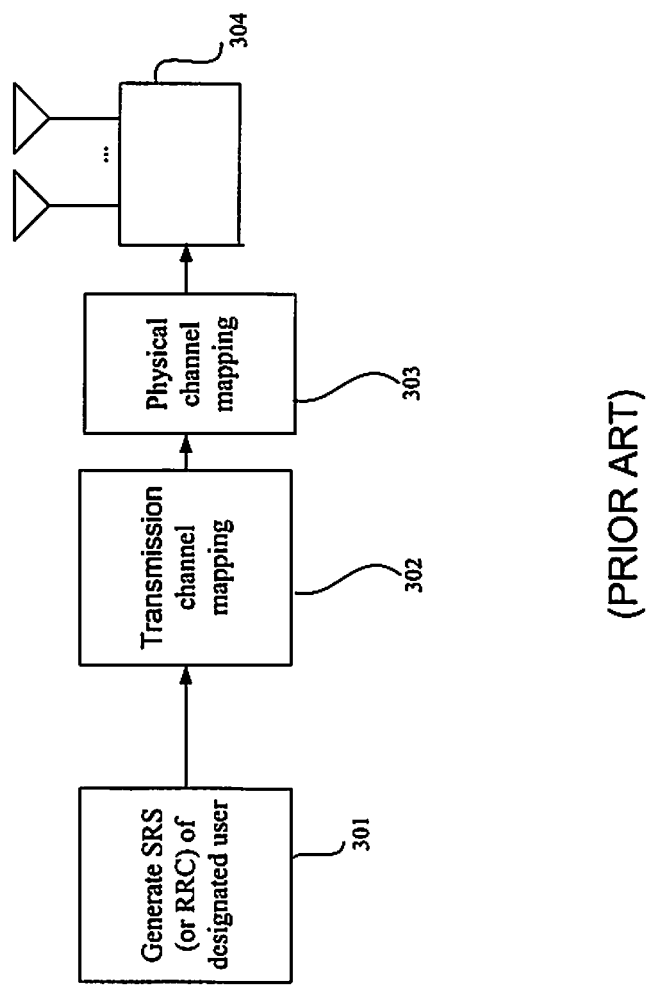
FIG. 3 is a schematic diagram illustrating an SRS transmission process of designated user in an LTE system.

An apparatus for transmitting an SRS of a designated user is illustrated in FIG. 3. The apparatus includes an SRS generator module (301) for generating the SRS information. The SRS information is mapped to a transmission channel module (302), passed to a physical channel mapping module (303), and the SRS of designated user is transmitted through the antenna (304).

Figure 4:
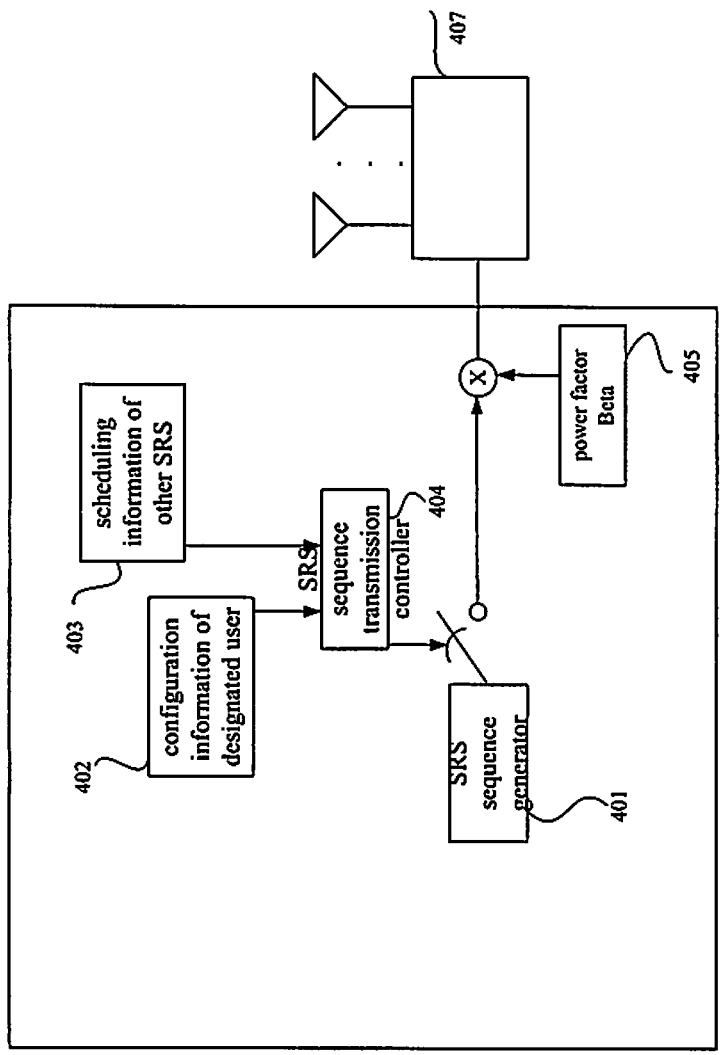
FIG. 4 is a schematic diagram illustrating an SRS transmission process of an LTE UE.

An apparatus for transmitting the SRS in LTE UE is illustrated in FIG. 4. The apparatus includes an SRS sequence generator (401) which generates an SRS sequence based on the SRS information of designated user received by a module (402) and the other information (such as the cycle offset used to transmit SRS, comb, the bandwidth and so on) received by a module (403). Under the control of a sequence transmission controller (404), the power is adjusted by a module (405) in the physical resource allocated at a proper timing and the SRS of designated user is transmitted by using an antenna (407).

Two examples for transmitting an SRS in an LTE TDD system according to embodiments of the present invention are described below. Detailed descriptions of known functions and components are omitted when they may obscure the description of the present invention in unnecessary detail.

A First Example

Figure 6:
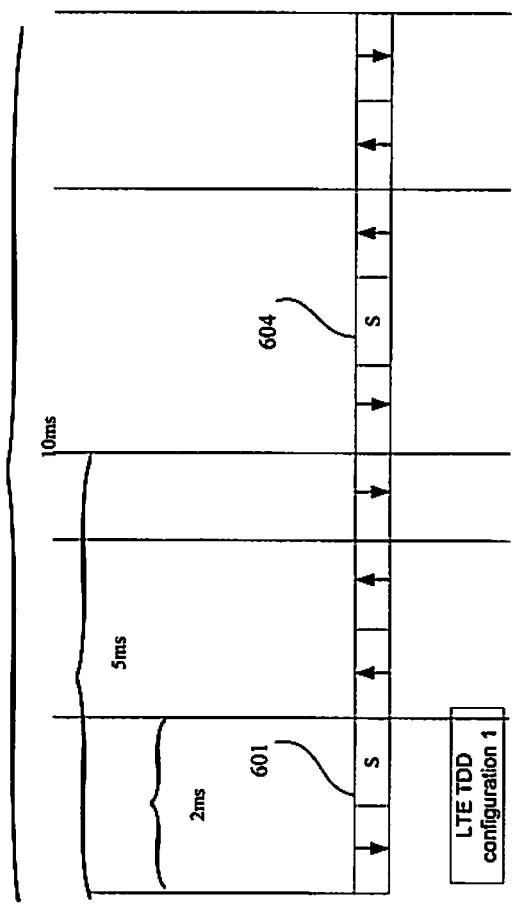
FIG. 6 illustrates an example of transmitting an SRS in an LTE TDD system according to an embodiment of the present invention.

Referring to FIG. 6, configuration 1 (602) in LTE TDD is applied in this example.

The signal information indicating the SRS transmission of a designated user is generated by the LTE network. According to Table 1, the index 635 is selected. For LTE TDD, the index indicates that the period is 2 ms, further indicating that the designated user transmits an SRS in the first and second symbol in an UpPTS (601 or 604). For LTE FDD, the index indicates that the designated user may use the available OFDM symbol in the first sub-frame in the 2 ms frame to transmit SRS. Then, via the transmission channel mapping and physical channel mapping, the system transmits the index information to the designated user.

A Second Example

Figure 7:
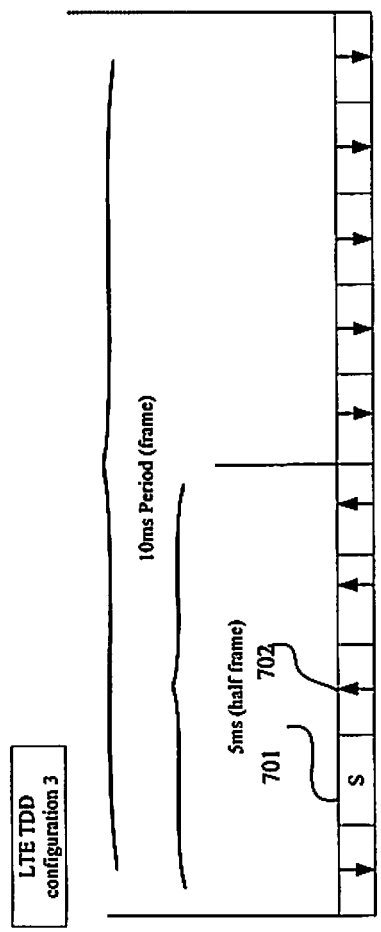
FIG. 7 illustrates an example of transmitting an SRS in an LTE TDD system according to an embodiment of the present invention.

Referring to FIG. 7, configuration 3 (704) in LTE TDD is applied in this example.

The signal information indicating the SRS transmission of a designated user is generated by the LTE network. According to Table 1, the index 637, which indicates that the period is 2 ms, is selected. For LTE TDD, the index indicates that the designated user transmits an SRS in the first symbol (701) and the first normal uplink sub-frame (sub-frame 2) (702). For LTE FDD, the index is reserved by the system and the system does not use the index to transmit SRS information of designated user. Then, after the transmission channel mapping and physical channel mapping, the system transmits the index information to the designated user.

While the present invention has been shown and described with reference to certain embodiments of the present invention, it will be understood by those skilled in the art that various changes in form and details may be made therein without departing from the spirit and scope of the present invention as defined by the appended claims and their equivalents.

What is claimed is:

1. A method for transmitting a sounding reference signal (SRS) in a wireless communication system, the method comprising:
   receiving information on an SRS period and at least one offset for an SRS transmission;
   generating at least one SRS; and
   performing the SRS transmission on at least one subframe in a radio frame, the at least one subframe being configured based on the information on the SRS period and the at least one offset, and an uplink-downlink (UL-DL) subframe configuration, wherein the at least one offset is associated with location of the at least one subframe in the radio frame,
   wherein the SRS transmission is performed four times on the at least one subframe in the radio frame, if the SRS period is configured with 2 ms and the UL-DL subframe configuration is 0, 1, 2, or 6, and
   wherein the SRS transmission is performed two times on the at least one subframe in the radio frame, if the SRS period is configured with 2 ms and the UL-DL subframe configuration is 3, 4, or 5.

2. The method of claim 1, wherein the information on the SRS period and the at least one offset comprises an SRS index among 10 SRS indices.

3. A method for receiving a sounding reference signal (SRS) in a wireless communication system, the method comprising:
   transmitting information on an SRS period and at least one offset for an SRS reception;
   performing the SRS reception on at least one subframe in a radio frame, the at least one subframe being configured based on the information on the SRS period and the at least one offset, and an uplink-downlink (UL-DL) subframe configuration, wherein the at least one offset is associated with location of the at least one subframe in the radio frame,
   wherein the SRS reception is performed four times on the at least one subframe in the radio frame, if the SRS period is configured with 2 ms and the UL-DL subframe configuration is 0, 1, 2, or 6, and
   wherein the SRS reception is performed two times on the at least one subframe in the radio frame, if the SRS period is configured with 2 ms and the UL-DL subframe configuration is 3, 4, or 5.

4. The method of claim 3, wherein the information on the SRS period and the at least one offset comprises an SRS index among 10 SRS indices.

5. A user equipment (UE) for transmitting a sounding reference signal (SRS) in a wireless communication system, the UE comprising:
- a transceiver configured to transmit and receive signals to and from a base station;
- a controller configured to control to receive information on an SRS period and at least one offset for an SRS transmission, generate at least one SRS, and perform the SRS transmission on at least one subframe in a radio frame, the at least one subframe being configured based on the information on the SRS period and the at least one offset, and an uplink-downlink (UL-DL) subframe configuration, wherein the at least one offset is associated with location of the at least one subframe in the radio frame,
- wherein the SRS transmission is performed four times on the at least one subframe in the radio frame, if the SRS period is configured with 2 ms and the UL-DL subframe configuration is 0, 1, 2, or 6, and
- wherein the SRS transmission is performed two times on the at least one subframe in the radio frame, if the SRS period is configured with 2 ms and the UL-DL subframe configuration is 3, 4, or 5.

6. The UE of claim 5, wherein the information on the SRS period and the at least one offset comprises an SRS index among 10 SRS indices.

7. A base station for receiving a sounding reference signal (SRS) in a wireless communication system, the base station comprising:
- a transceiver configured to transmit and receive signals to and from a user equipment (UE);
- a controller configured to control to transmit information on an SRS period and at least one offset for an SRS reception, and perform the SRS reception on at least one subframe in a radio frame, the at least one subframe being configured based on the information on the SRS period and the at least one offset, and an uplink-downlink (UL-DL) subframe configuration, wherein the at least one offset is associated with location of the at least one subframe in the radio frame,
- wherein the SRS reception is performed four times on the at least one subframe in the radio frame, if the SRS period is configured with 2 ms and the UL-DL subframe configuration is 0, 1, 2, or 6, and
- wherein the SRS reception is performed two times on the at least one subframe in the radio frame, if the SRS period is configured with 2 ms and the UL-DL subframe configuration is 3, 4, or 5.

8. The base station of claim 7, wherein the information on the SRS period and the at least one offset comprises an SRS index among 10 SRS indices.

* * * * *